US011540498B2

(12) United States Patent
Kovacs

(10) Patent No.: US 11,540,498 B2
(45) Date of Patent: Jan. 3, 2023

(54) SPINNER LURE

(71) Applicant: Richard Kovacs, Cape Coral, FL (US)

(72) Inventor: Richard Kovacs, Cape Coral, FL (US)

( * ) Notice: Subject to any disclaimer, the term of this patent is extended or adjusted under 35 U.S.C. 154(b) by 266 days.

(21) Appl. No.: 15/817,220

(22) Filed: Nov. 19, 2017

(65) Prior Publication Data

US 2019/0150415 A1    May 23, 2019

(51) Int. Cl.
*A01K 85/10* (2006.01)
*A01K 85/00* (2006.01)
*A01K 85/02* (2006.01)

(52) U.S. Cl.
CPC .......... *A01K 85/10* (2013.01); *A01K 85/1871* (2022.02); *A01K 85/1877* (2022.02); *A01K 85/02* (2013.01)

(58) Field of Classification Search
CPC ........ A01K 85/10; A01K 85/02; A01K 85/12; A01K 85/122; A01K 85/1871; A01K 85/1877; A01K 85/00
USPC .................................. 43/42.13, 42.11, 42.14
See application file for complete search history.

(56) References Cited

U.S. PATENT DOCUMENTS

| | | | | |
|---|---|---|---|---|
| 1,295,617 A | * | 2/1919 | Shannon | A01K 85/02 43/42.4 |
| 1,995,985 A | * | 3/1935 | Jennings | A01K 85/08 43/42.13 |
| 2,778,144 A | * | 1/1957 | Clyde | A01K 85/00 43/42.34 |
| 2,821,044 A | * | 1/1958 | Bateman | A01K 85/16 43/42.16 |
| 3,093,923 A | * | 6/1963 | Jackson | A01K 85/00 43/42.11 |
| 3,143,824 A | * | 8/1964 | Johnw | A01K 85/00 43/42.26 |
| 3,226,875 A | * | 1/1966 | Woolums | A01K 85/10 43/42.31 |
| 3,253,363 A | * | 5/1966 | Steehn | A01K 85/00 43/42.45 |
| 3,257,750 A | * | 6/1966 | Shannon | A01K 85/00 D22/128 |
| 3,504,454 A | * | 4/1970 | Turbeville | A01K 85/00 43/42.49 |

(Continued)

FOREIGN PATENT DOCUMENTS

JP    3037879 B2 *  5/2000
JP    2009038973 A *  2/2009

(Continued)

*Primary Examiner* — Darren W Ark
(74) *Attorney, Agent, or Firm* — Andrew Morabito

(57) ABSTRACT

A fishing lure comprising at least two wires having a first end and a second end, wherein a first portion of the at least two wires are intertwined with one another, and wherein a predetermined distance from the first end a first bend is made and distal to the first bend, a second bend is made, and predetermined distance from the second bend a second portion of the at least two wires are untwined and a loop is formed at the second end of each of the at least two wires, a head molded around a portion of the first end of the at least two wires, a hook affixed to the head, and at least one spinner rotatably attached to the loop at the second end of each of the at least two wires, wherein the spinner is able to freely oscillate and vibrate.

7 Claims, 4 Drawing Sheets

(56) References Cited

U.S. PATENT DOCUMENTS

| | | | | |
|---|---|---|---|---|
| 3,747,256 A * | 7/1973 | Haddock | ............... | A01K 85/00 43/42.13 |
| 3,750,325 A * | 8/1973 | Feltman | ............... | A01K 85/00 D22/129 |
| 3,890,736 A * | 6/1975 | Worden | ............... | A01K 85/00 43/42.11 |
| 4,011,681 A * | 3/1977 | Johnson | ............... | A01K 85/00 43/42.11 |
| 4,037,345 A * | 7/1977 | Dubois | ............... | A01K 85/00 43/42.4 |
| 4,133,135 A * | 1/1979 | Miles | ............... | A01K 85/00 43/42.13 |
| 4,571,877 A * | 2/1986 | Montgomery | ............... | A01K 85/00 D22/128 |
| 4,638,586 A * | 1/1987 | Hall | ............... | A01K 85/00 43/42.13 |
| 4,640,041 A * | 2/1987 | Stanley | ............... | A01K 85/00 43/42.32 |
| 4,815,233 A * | 3/1989 | Pingel | ............... | A01K 85/00 43/42.11 |
| 4,884,358 A * | 12/1989 | Grove | ............... | A01K 85/00 43/42.13 |
| 4,901,470 A * | 2/1990 | Gentry | ............... | A01K 85/00 43/42.72 |
| 5,355,612 A * | 10/1994 | Smith | ............... | A01K 85/00 43/42.11 |
| 5,400,542 A * | 3/1995 | Johnson | ............... | A01K 85/01 43/42.13 |
| 5,605,004 A * | 2/1997 | Boullt | ............... | A01K 85/00 43/42.13 |
| 5,647,163 A * | 7/1997 | Gorney | ............... | A01K 85/00 43/42.32 |
| H1865 H * | 10/2000 | Aoki | ............... | 43/42.19 |
| D471,951 S * | 3/2003 | Bowman | ............... | D22/129 |
| 6,701,662 B1 * | 3/2004 | Moore | ............... | A01K 85/00 43/42.11 |
| 6,748,692 B2 * | 6/2004 | Sprouse | ............... | A01K 85/10 43/42.11 |
| 6,796,080 B1 * | 9/2004 | Mathews, Jr. | ............... | A01K 85/00 43/42.11 |
| 6,880,287 B2 * | 4/2005 | Eubanks | ............... | A01K 85/00 43/42.24 |
| 7,467,491 B1 * | 12/2008 | Slocum | ............... | A01K 85/10 43/42.13 |
| 8,347,547 B1 * | 1/2013 | Houdek | ............... | A01K 91/065 43/42.11 |
| 8,539,901 B2 | 9/2013 | Chittum | | |
| 8,607,499 B2 | 12/2013 | Hoover | | |
| 8,763,301 B2 | 7/2014 | Lau | | |
| 8,813,416 B2 | 8/2014 | Hudson et al. | | |
| 8,857,099 B1 * | 10/2014 | Hamrick, Jr. | ............... | A01K 85/00 43/42.11 |
| 8,910,416 B2 | 12/2014 | Bennis | | |
| 9,003,690 B1 * | 4/2015 | Rye | ............... | A01K 85/10 43/42.74 |
| D738,988 S * | 9/2015 | Ingram | ............... | D22/129 |
| 9,339,019 B2 | 5/2016 | Dages | | |
| 9,516,870 B2 | 12/2016 | Goosey | | |
| 10,531,649 B2 * | 1/2020 | VanZant | ............... | A01K 85/10 |
| 10,834,909 B1 * | 11/2020 | Rye | ............... | A01K 85/10 |
| 2003/0074828 A1 | 4/2003 | Sprouse | ............... | A01K 85/10 43/42.13 |
| 2003/0145510 A1 * | 8/2003 | Kohigashi | ............... | A01K 85/00 43/42.13 |
| 2003/0233782 A1 * | 12/2003 | Routsaw | ............... | A01K 85/00 43/42.13 |
| 2004/0221502 A1 * | 11/2004 | Eubanks | ............... | A01K 85/00 43/42.13 |
| 2005/0229473 A1 * | 10/2005 | Altman | ............... | A01K 85/12 43/42.11 |
| 2006/0005458 A1 * | 1/2006 | Maki | ............... | A01K 85/00 43/42.13 |
| 2007/0006517 A1 * | 1/2007 | Grimaldi | ............... | A01K 85/00 43/42.19 |
| 2009/0172993 A1 * | 7/2009 | Willis | ............... | A01K 85/00 43/42.31 |
| 2012/0000112 A1 * | 1/2012 | Osler | ............... | A01K 85/00 43/42.39 |
| 2015/0201593 A1 * | 7/2015 | Prantl | ............... | A01K 85/00 43/42.49 |
| 2017/0231207 A1 * | 8/2017 | Tarazona Sicilia | .... | A01K 85/02 43/42.09 |
| 2017/0339933 A1 * | 11/2017 | Smith | ............... | A01K 85/10 |
| 2017/0347635 A1 * | 12/2017 | Sandefur | ............... | A01K 85/02 |
| 2018/0055024 A1 * | 3/2018 | Webber | ............... | A01K 85/10 |
| 2019/0104711 A1 * | 4/2019 | Coxey | ............... | A01K 95/02 |
| 2019/0166813 A1 * | 6/2019 | VanZant | ............... | A01K 85/10 |
| 2020/0060248 A1 * | 2/2020 | Choate | ............... | A01K 85/10 |

FOREIGN PATENT DOCUMENTS

| | | | | |
|---|---|---|---|---|
| JP | 2012019731 A | * | 2/2012 | |
| JP | 2012147701 A | * | 8/2012 | |
| JP | 2015039329 A | * | 3/2015 | |
| KR | 200412480 Y1 | * | 3/2006 | |
| KR | 200421114 Y1 | * | 7/2006 | |
| WO | WO-9824309 A1 | * | 6/1998 | ............ A01K 85/00 |
| WO | WO-2017137557 A1 | * | 8/2017 | ............ A01K 85/00 |

* cited by examiner

SPINNER LURE

BACKGROUND

The present invention relates generally to the field of fishing lures, and more particularly to a fishing lure with a plurality of independently spinning extensions.

Sport fishing has been and continues to be enjoyed by a vast number of fisherman and has grown to the extent that it is now one of the largest participant sports. As the sport of fishing has increased in popularity, the fishing tackle industry has experienced growth, responding both to the needs of the participants.

A "spinnerbait" is a lure which combines both a "spinner" and some other type of fish attractor, along with a weight and a hook into a single form. The lure has a generally V-shaped wire form, and at one end of the wire form is attached one or more blades or "spinners" which rotate about a swivel as the lure is drawn through the water.

At the other end of the wire form, a lead body or weight is molded, and a hook is attached adjacent the weight. The hook is turned upwardly toward the other end of the wire form. Some type of device is attached to the area of the hook shank to further attract fish, most commonly being a soft plastic worm or grub or piece of pork rind, or alternatively a plastic or rubber skirt which extends rearwardly to hide the hook and "ripple" through the water as the lure is retrieved.

One drawback with the designs of spinnerbait is the tradeoff between structural rigidity and the ability to vibrate through the water. If the lure is made to handle a larger fish the lure requires a larger construction which reduces the ability of the spinner to vibrate through the water, and if the lure is designed to vibrate through the water, they lack the strength to withstand a larger fish. Thus, resulting in either broken or lost lures, or the inability to properly attract the fish.

Thus, it is desired to have a fishing lure that provides the structural strength of a larger lure, but with the spinners having the ability to vibrate through the water.

SUMMARY

According to one aspect of the present invention, a fishing lure is provided.

In one variant a fishing lure comprising at least two wires having a first end and a second end, wherein a first portion of the at least two wires are intertwined with one another, and wherein a predetermined distance from the first end a first bend is made and distal to the first bend, a second bend is made, and predetermined distance from the second bend a second portion of the at least two wires are untwined and a loop is formed at the second end of each of the at least two wires, a head molded around a portion of the first end of the at least two wires, a hook affixed to the head, and at least one spinner rotatably attached to the loop at the second end of each of the at least two wires, wherein the spinner is able to freely oscillate and vibrate.

In another variant, a fishing lure comprising, a plurality of wires having a first end and a second end, wherein a first portion of the plurality of wires are twisted and a predetermined distance from the first end the plurality of wires have a first bend and distal to the first bend the plurality of wires have a second bend and distal to the second bend a second portion of the plurality of wires are untwisted and each of the plurality of wires extend in a predetermined direction, a predetermined distance and a loop is formed at the second end of each of the plurality of wires, a body having a predetermined shape is formed around a portion of the first end of the plurality of wires, a hook is attached to the body, at least one spinner rotatably attached to the loop at the second end of at least one of the plurality of wires, wherein the spinner is able to freely oscillate, rotate, and vibrate.

DETAILED DESCRIPTION

The present invention relates to a lure which allows for an increased structural integrity while also allows for the extensions to vibrate as they travel through the water. The lure allows the participant to experience the benefits of the spinner lure design without the fear that the lure will not be able to hook and keep a larger fish. The lure design allows for a lure with a multitude of spinners based on the main body design that is split to create the spinner extensions.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The invention will now be described in relation to the Figures.

Figure 1:
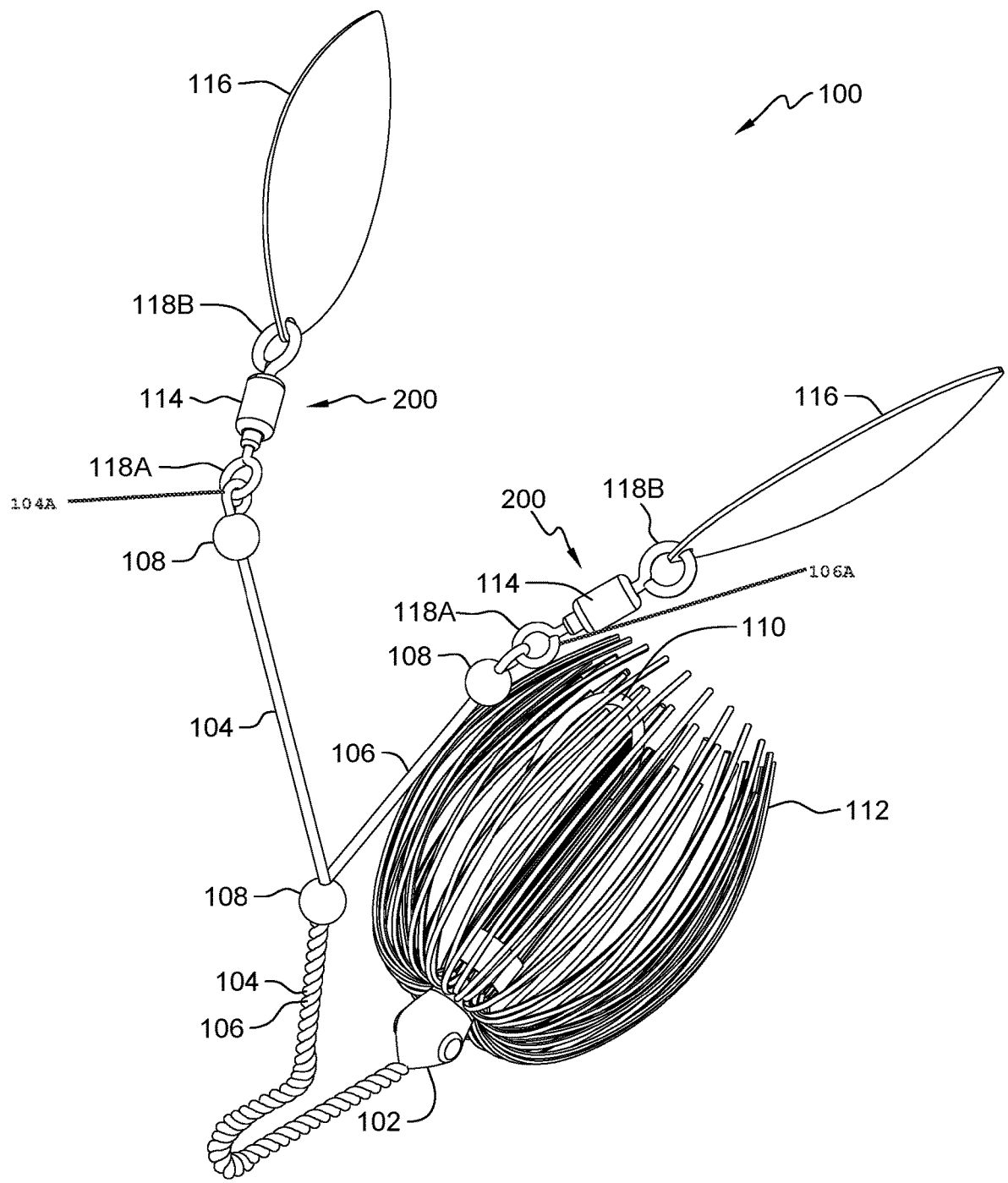
FIG. 1 depicts a perspective view of a lure, in accordance with one embodiment of the present invention.

FIG. 1 depicts a perspective view of a lure 100, in accordance with one embodiment of the present invention. In the depicted embodiment, the lure 100 is comprised of a head 102, a skirt 112, a hook 110, a first wire 104, a second wire 106, a plurality of stoppers 108, an attachment means 200, and plurality of spinner blades 116. In additional embodiments, there may be additional wires, stoppers, spinner blades, hooks, or other elements.

The head 102 of the lure 100 is designed to act as a weight and may be constructed of a relatively heavy material, such as metal. Brass or stainless steel may be used. The head 102 is used to act as a sinker, and also provide the base for the hook 110 and the wires 104 and 106 to be affixed to or molded within. In the shown embodiment, the head 102 is designed to look like the head of an animal or fish. The head 102 may have various designs, shapes, colors, features (e.g. the eye shown in the figure) to make the lure 100 appear more realistic to the specific type of fish which the lure is designed for. The head 102 is designed to produce adequate weight so that the lure 100 drops to the desired depth based on the type of fish and the size and weight of the lure 100. Any color or type of paint may be used, and the head 102 may be in almost any configuration, as long as it represents an attractive bait for the type of fish to be caught. In some embodiments, the head 102 has a loop or attachment point for the string or thread that the fisherman uses to tie the lure 100 to the reel. In some embodiments, the fisherman may tie the string or thread around the intertwined wires.

The skirt 112 is attached to the head 102 and used to draw attention of the fish in the area. The skirt 112 may be attached to the head 102 via various means to permanently affix the skirt 112 to the head 102. For example, but not limited to, welding, fusing, or using an adhesive to affix the skirt 112 to the head 102. The skirt 112 is comprised of a plurality of filaments. The filaments may be made from a plastic, a fabric, a, composite material, or a material known to one of skill in the art. The filaments are a predetermined thickness, a predetermined length, and a predetermined quantity. The skirt 112 may be one color or a combination thereof and may have different types of materials and hews distending in both directions from where the skirt 112 is affixed to the head 102. From 32 to 120 filaments of the skirt 112 are preferred in most lures. The length of the skirt 112 may also vary as to the size of the hook 110 and the type of fish to be caught. In some embodiments, the skirt 112 is detachable and replaceable with a locking mechanism implemented to allow this release and replacement of the skirt 112. In additional, embodiments, the skirt 112 is secured to the head 102 by various means that require additional elements to securely affix the skirt 112 to the head 102. The skirt 112 and the head 102 provide a mass to attract the fish.

The hook 110 is a conventional fishing hook and is affixed to the head 102 of the lure 100. The hook 110 size may vary, depending on the application. Various styles of hooks 110 may be employed, and more than one hook 110 may be used. For example, a single, double, or treble hook 110 may be used.

The first and second wire 104 and 106 are wire shafts which are affixed to the head 102 and extend from the head 102 in a predetermined design. The wires 104 and 106 are round metallic wires, preferably stainless steel, or various other metals which provide adequate strength, rigidity, and flexibility. This rigidity provides the strength of the overall lure 100 design, while the flexibility provides the ability for the wires 104 and 106 to vibrate when being moved through the water to attract the fish. In one embodiment, the wires 104 and 106 have substantially similar thicknesses. In additional embodiments, the wires 104 and 106 may have different thicknesses. The wires 104 and 106 may have a gauge ranges from 10 to 24. In additional embodiment, other gauges of the wire may be used. In additional embodiments, three or more wires may be used.

In the depicted embodiment, the wires 104 and 106 twists or intertwined together substantially at the point where the wires are exposed from the head 102. The intertwining of the wires 104 and 106 produces a stronger more rigid portion of the lure 100. In some embodiments, the wires 104 and 106 are intertwined a predetermined distance from the head 102. In the depicted embodiment, the intertwined wires 104 and 106 extend outward from the head 102 and after a predetermined distance, the wires 104 and 106 reach an apex 101 to form a "U" shape. The wires 104 and 106 continue a second predetermined distance and reach a bend 103. The bend 103 is at a predetermined angle from the apex 101. After a third predetermined distance, the wires 104 and 106 reach a point where the wires are separated. At the separation point, the wires 104 and 106 are angled in predetermined directions. The wires 104 and 106 after the separation point are less rigid due to the smaller overall radius and provide an increased flexibility to allow the wires 104 and 106 to vibrate in the water at a greater frequency than when the wires are intertwined. This divide of the wires 104 and 106 being intertwined for a set portion and separated for a set portion provides the increased strength and flexibility that has not been seen before.

After the separation wires 104 and 106 extend for a predetermined distance and at their distal ends, a contiguous loop 104A and 106A is formed. The loop 104A and 106A may be formed by bending the distal end of the wire into an eye and twisting around the wire. In some embodiments, loops 104A and 106A are substantially the same design. In additional embodiments, loops 104A and 106A are of different designs, sizes, and shapes. In additional embodiments, loops 104A and 106A may form a quick release closure, or a closure that is openable. The loop 104A and 106A are of a predetermined size.

In additional embodiments, there may be three more wires which are intertwined and then separated to allow for addition extensions. Each of the extensions is angled in a predetermined angle. In the depicted embodiment, the separate wires 104 and 106 extend substantially the same distance from the separation point. In additional embodiments, the wires 104 and 106 may have different lengths after the separation point.

The stoppers 108 is designed to secure various parts of the lure 100 to reduce the possibility of parts becoming detached, or damaged. In the depicted embodiment, the stopper 108 are positioned at the separation point to add additional protection to reduce the possibility of one of the wires breaking or snapping. Additionally, the stopper 108 is used at the distal end of the wire where the loop is formed to substantially secure the loop closed. The stoppers 108 are constructed from a relatively strong material, such as metal. Brass or stainless steel may be used as well. The stopper 108 may have a coloring or design to further attract the fish's attention.

The attachment means 200 are comprised of a first closure 118A, a swivel 114, and a second closure 118B. In the depicted embodiment, the first closure 118A is secured to the loop (104A and 106A), but are freely connected so that the attachment means 200 are able to shift and adjust. The first closure 118A may be detachable. The swivel 114 is designed to allow for the spinner blade 116 to freely rotate while the remainder of the lure 100 remains stagnant in its rotation. The swivel 114 is known in the art, and various swivels 114 may be used. The second closure 118B connects the swivel 114 to the spinner blade 116. The second closure 118B and the spinner blade 116 are secured to one another and the spinner blade 116 is able to freely move. In some embodiments, the second closure 118B is detachable so the participant may change the type of spinner blade 116 with ease. In some embodiments, the attachment means 200 is a complete assembly as known to those skilled in the art. In additional embodiments, the attachment means 200 is a plurality of individual elements combined together. In the depicted embodiment, each loop 104A and 106A have one attachment means 200 secured and each attachment means 200 has one spinner blade 116 attached. In additional embodiments more than one attachment means 200 may be connected to the loops, and more than one spinner blade 116 may be connected to the attachment means.

The spinner blades 116 are rotatably attached to the attachment means 200. In the depicted embodiment, both attachment means 200 have a spinner blade 116 attached. In additional embodiments, more than one spinner blade 116 or varying spinner blades 116 may be attached to one or both of the attachment means 200. Any spinner blades 116 may be used with equal ease, as much development has been accomplished in that specific field of endeavor. The spinner blades 116 differ in shape of the blade, amount of cup and texture or color. Some types of spinner blades 116 are, for example, but not limited to, willow leaf, the Colorado, the French, Indiana, and a number of buzz blades. These spinner blades 116 are usually metallic and may be plated with nickel, chrome, gold, copper, etc., or simply painted almost any bright color. The purpose of the spinner blade 116 is to attract fish, therefore, the combination of color, texture, shape, and configuration may vary as to the type of fish to be attracted and the movement characteristics, along with the depth variations created by each design.

Figure 2:
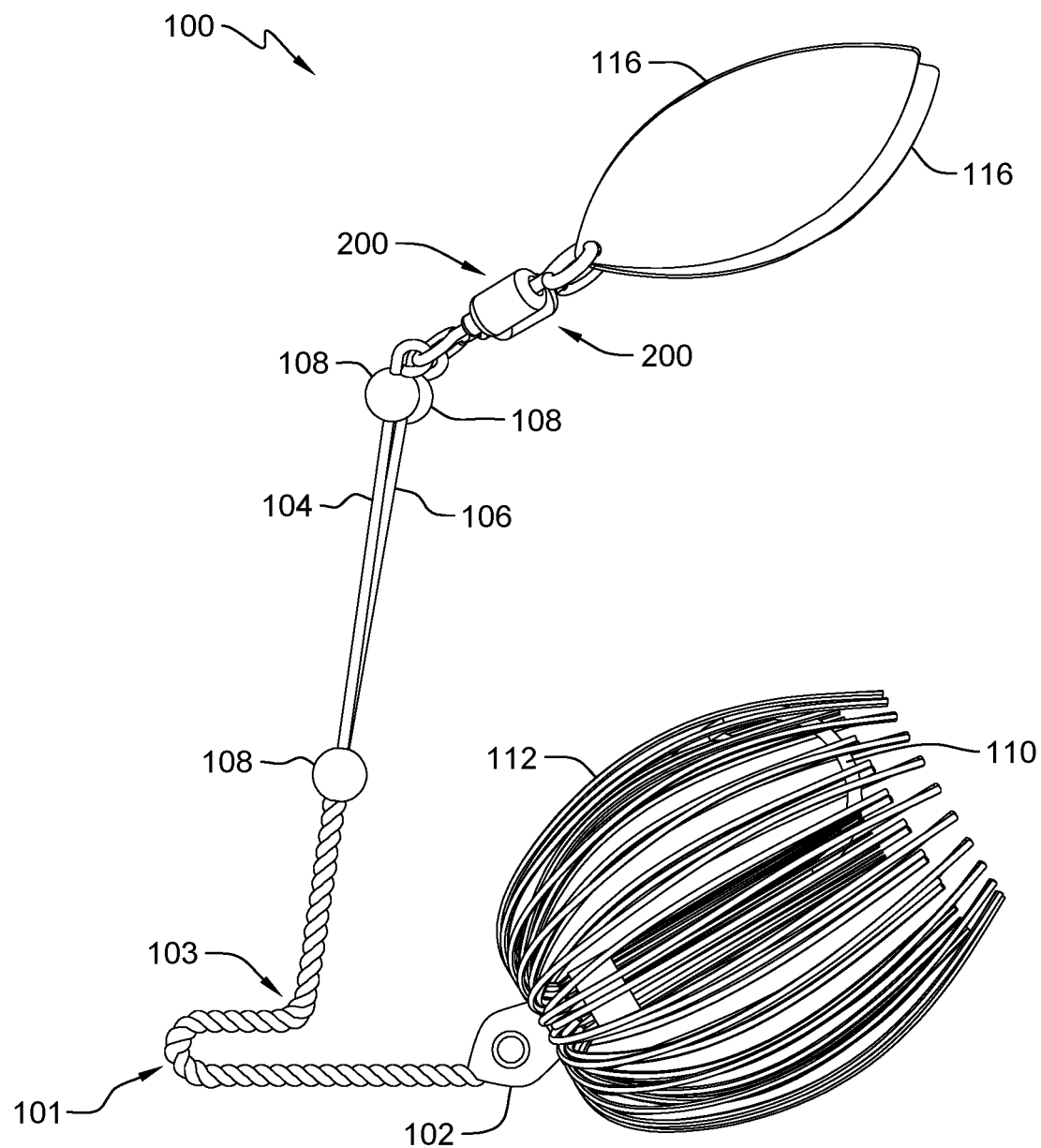
FIG. 2 depicts a side view of the lure, in accordance with an embodiment of the present invention.

FIG. 2 depicts a side view of the lure, in accordance with an embodiment of the present invention. In the depicted embodiment, the apex 101 is shown have a substantially 180 degrees turn in the wires 104 and 106. In additional embodiments, various degrees of the turn may be employed. The bend 103 is shown having a substantially 90-degree turn. In additional embodiments, various degrees of the bend 103 may be employed.

Figure 3:
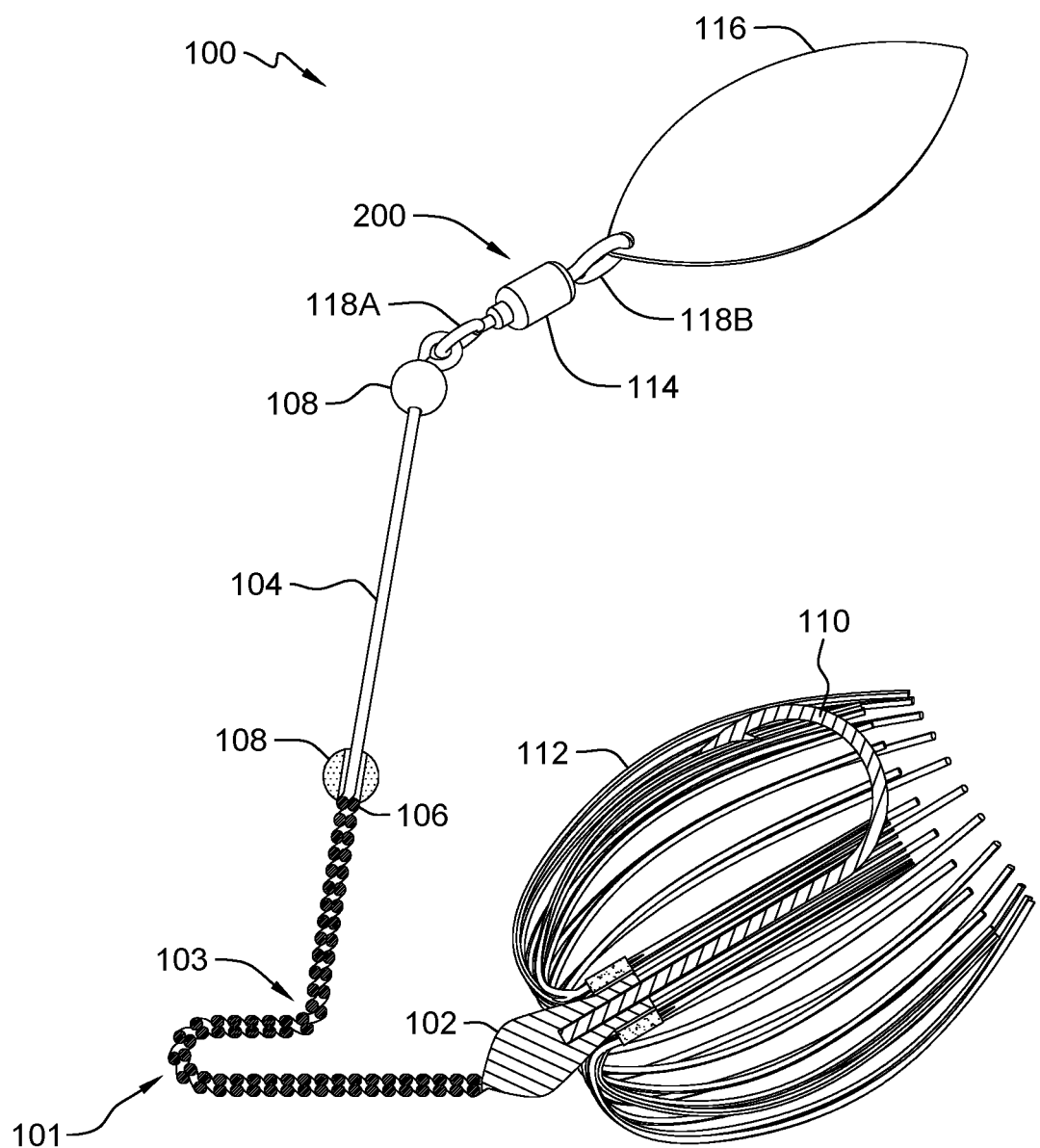
FIG. 3 depicts a section view of the lure, in accordance with an embodiment of the present invention.

FIG. 3 depicts a section view of the lure, in accordance with an embodiment of the present invention. The head 102 is molded with a portion of the hook 110 and the wires 104 and 106 to secure the elements together so that when a fish is hooked, the lure 100 will not disassemble. Within the stoppers 108, the wire 106 and 104 are unwound and are bend or directed in a predetermined direction. The separation point is within the stopper 108 to protect this area of the wires, as this tends to be the weakest part of the wire and the stopper 108 assists in protecting the bent portion of the wire.

Figure 4:
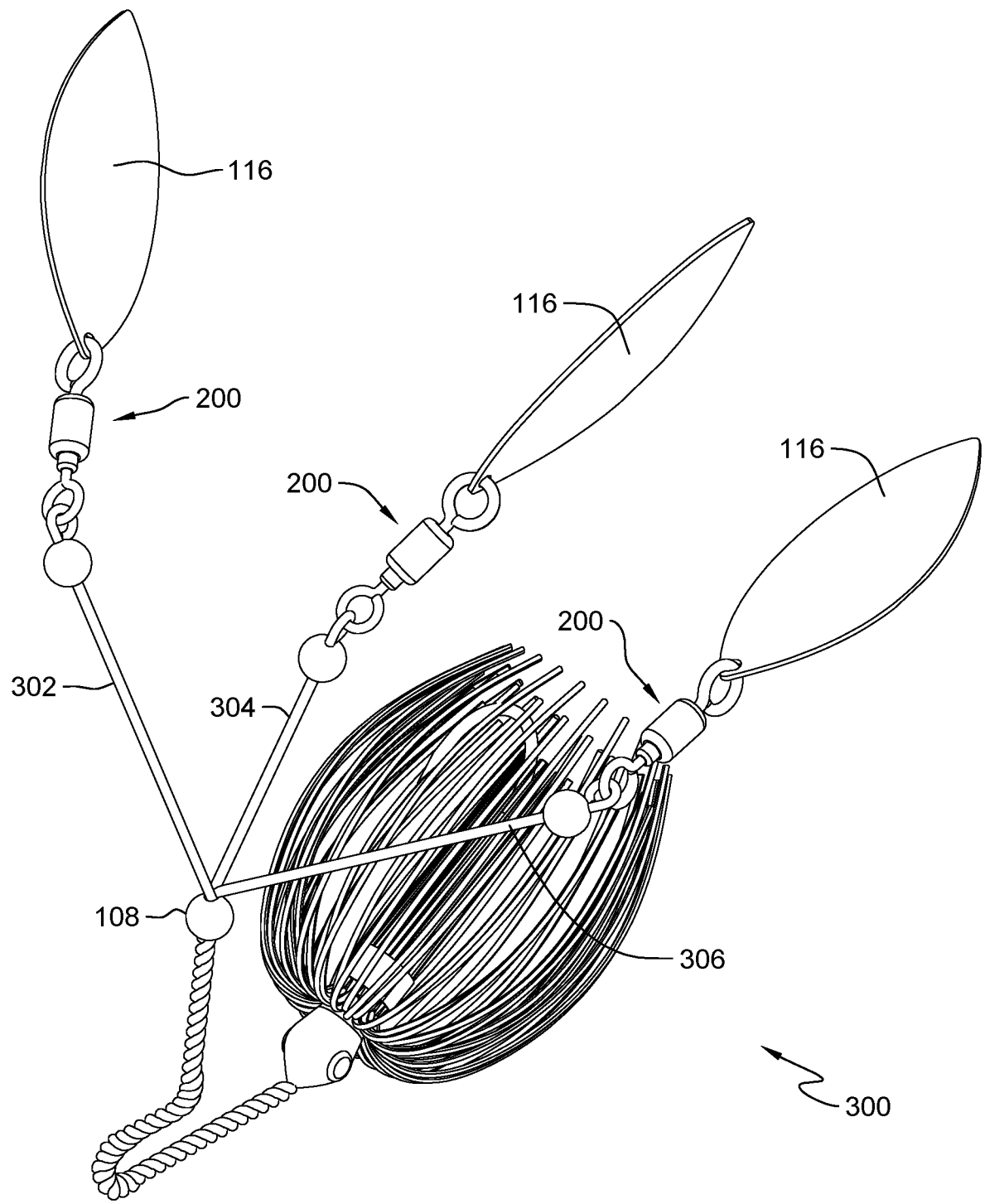
FIG. 4 depicts a perspective view of the lure, in accordance with another embodiment of the present invention.

FIG. 4 depicts a perspective view of the lure 300, in accordance with another embodiment of the present invention. This lure 300 is shown with a plurality of wires 302, 304, and 306 extending beyond the separation point encapsulated by the stopper 108. Along the exposed wires 302, 204, and 206, a plurality of attachments 200 are shown. A spinner blade 116 is shown rotatably attached to the attachments 200. In additional embodiments, more or less wires may be integrated into the lure 300. In further embodiments, the number of wires which is used within the portion of the lure which is wound may not extend beyond the stopper 108. This will increase the strength of the wound portion of the wires, while keeping the number of spinner blades 116 or attachments to a predetermined number. This may happen, for example, where the fish is strong enough to break a lure 300 with less than two different wires, but is less likely to bite a lure with many spinners blades 116 or attachments.

In additional embodiments, additional beads may be used along the unwound portion of the wires to provide additional elements which will move or shift in the water to draw attention to the fish. These beads are able to slide up and down the wires. In additional embodiments, there may be additional spinner blade 116 attached to the attachment means 200, so that one attachment means 200 may have more than one spinner blade 116.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A fishing lure comprising:
   a head;
   a plurality of wires each having a first end and a second end, wherein the head is secured to the first ends of the plurality of wires, wherein a first portion of the plurality of wires comprise the plurality of wires being intertwined with each other, and the first portion of the plurality of wires having a first section extending from the first ends of the plurality of wires and ending at a first bend of approximately 180 degrees, a second section extending from the first bend and ending at a second bend of approximately 90 degrees, and a third section extending from the second section and ending at a junction with a second portion of the plurality of wires, wherein at a separation point between the first portion and the second portion, the second portion comprises the wires of the plurality of wires being untwined from each other and the wires of the plurality of wires extending in predetermined directions, and wherein the wires of the plurality of wires have varying lengths and radii;

at least one swivel rotatably attached to each of the second ends of the plurality of wires, wherein the at least one swivel is able to freely oscillate and vibrate, and wherein the second end of each of the plurality of wires are formed into a closed loop and the at least one swivel is attached to each of the second ends of the plurality of wires via the closed loop;

a spinner blade attached to each of the at least one swivel, wherein the spinner blade is able to free oscillate and vibrate;

at least one bead integrated at the separation point of the plurality of wires between the first portion and the second portion and adjacent the second ends of the plurality of wires at the closed loops of the plurality of wires; and a hook affixed to the head;

wherein the plurality of wires and the hook do not interface with each other within the head.

2. The fishing lure of claim 1, further comprising a skirt made of a plurality of filaments affixed to the head, wherein the skirt is sized to encapsulate the hook within the skirt.

3. The fishing lure of claim 1, wherein the head has markings to imitate that of a feeder fish.

4. The fishing lure of claim 1, wherein the first bend of approximately 180 degrees and the second bend of approximately 90 degrees are aligned so that the first portion of the plurality of wires is along a plane.

5. The fishing lure of claim 1, further comprising at least one other bead freely attached to the second portion of at least one of wires of the plurality of wires, wherein the at least one other bead is able to move along the second portion of the at least one wire of the plurality of wires.

6. A fishing lure comprising:

a lure body having a first end and a second end;

a hook is attached to the second end of the lure body;

a skirt attached to the second end of the lure body, wherein the hook is contained within the skirt;

at least three wires each having a first end and a second end, wherein the first ends of the at least three wires are attached to the first end of the lure body, a first portion of the at least three wires are twisted about each other and the first portion of the at least three wires extend from the first ends of the at least three wires and have a first bend of approximately 180 degrees directed towards the lure body and a second bend of approximately 90 degrees directed away from the lure body, and a second portion of the at least three wires wherein each of the at least three wires are untwisted from each other and separated from one another and extend in predetermined directions and the second end of each of the at least three wires is formed into a closed loop and the second ends of the at least three wires are positioned relative to the lure body, wherein the at least three wires and the hook do not interface with each other within the body, and wherein the at least three wires have varying lengths and radii;

a swivel attached to each of the closed loops;

a spinner attached to each of the swivels; and a bead attached adjacent each of the second ends of the at least three wires at the closed loops and another bead attached between the first and second portions of the wire.

7. The fishing lure of claim 6, wherein the first bend of approximately 180 degrees and the second bend o approximately 90 degrees are along a central axis of the lure body.

* * * * *